US 12,305,985 B1

(12) United States Patent
Pelliccione et al.

(10) Patent No.: US 12,305,985 B1
(45) Date of Patent: May 20, 2025

(54) GYROSCOPE SENSORS HAVING NODAL PUSH-PULL ACTUATION AND ANTINODAL READOUT

(71) Applicant: HRL Laboratories, LLC, Malibu, CA (US)

(72) Inventors: Matthew Pelliccione, Malibu, CA (US); Logan Sorenson, Malibu, CA (US); David Chang, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 285 days.

(21) Appl. No.: 18/082,587

(22) Filed: Dec. 16, 2022

(51) Int. Cl.
*G01C 19/56* (2012.01)
*G01C 19/5691* (2012.01)

(52) U.S. Cl.
CPC .............. *G01C 19/5691* (2013.01)

(58) Field of Classification Search
CPC ..... G01C 19/00; G01C 19/56; G01C 19/5691
See application file for complete search history.

(56) References Cited

U.S. PATENT DOCUMENTS

| | | | |
|---|---|---|---|
| 6,343,509 B1 | 2/2002 | Fell et al. | |
| 6,823,734 B1 | 11/2004 | Hayworth et al. | |
| 7,040,163 B2 | 5/2006 | Shcheglov et al. | |
| 9,671,247 B2* | 6/2017 | Okon | G01C 25/00 |
| 9,810,535 B2 | 11/2017 | Trusov | |
| 9,989,363 B2* | 6/2018 | Saito | G01C 19/5691 |
| 10,234,288 B2* | 3/2019 | Tallur | G01C 19/5684 |
| 10,236,858 B1 | 3/2019 | Sorenson et al. | |
| 2014/0260611 A1* | 9/2014 | Johari-Galle | G01C 19/5698 |
| | | | 73/504.12 |

* cited by examiner

*Primary Examiner* — Nguyen Q. Ha
(74) *Attorney, Agent, or Firm* — Ladas & Parry, LLP

(57) ABSTRACT

A CVG having a resonator with two degenerated modes each with a nodal direction and an antinodal direction, with drive electrodes arranged near the respective nodal directions of the resonator and sense electrodes arranged near the respective antinodal directions of the resonator.

8 Claims, 2 Drawing Sheets

GYROSCOPE SENSORS HAVING NODAL PUSH-PULL ACTUATION AND ANTINODAL READOUT

CROSS REFERENCE TO RELATED APPLICATIONS

NA

STATEMENT REGARDING FEDERAL FUNDING

NA

TECHNICAL FIELD

This disclosure relates to Coriolis vibratory gyroscopes.

BACKGROUND

Coriolis vibratory gyroscope (CVG) comprise a resonant structure or resonator that exhibits a degeneracy in its modal structure and comprises at least two modes at a same energy. Preferably, the two modes are of the second order or above. The resonator is arranged such that Coriolis force couples energy from a first mode, along which the resonator is made to resonate, to the other mode when a rotation rate is applied with respect to an axis of the resonator. The rate at which energy is transferred to this second mode is a measure of the rotation rate about the axis of the resonator. CVGs are particularly suitable for being manufactured as MEMs and are thus desirable in a number of apparatuses, such as environmentally robust, high-performance inertial sensors with attractive CSWaP (Cost Size Weight and Power), for example in weapon systems or vehicle navigational and/or location systems.

FIG. 1 illustrates a known CVG 10 that comprises an axisymmetric plane resonator 12 that has a two degenerate vibratory modes (having a same energy or resonance frequency), "mode 1" and "mode 2" having each an antinodal direction illustrated by a double arrow and representing the direction of maximal deformation of the resonator resonating along the respective modes. It is known to drive and measure the oscillations of the resonator 12 using a plurality of capacitive electrodes arranged at a distance along a periphery of the resonator 12. As illustrated in FIG. 1, oscillation of resonator 12 along the mode 1 can be driven using a first drive electrode 14 arranged along the antinodal direction of mode 1 and the motion of resonator 12 along the mode 1 can be sensed using a first sense electrode 16 arranged symmetrically to drive electrode 14 with respect to the center 15 of the resonator. Drive electrode 14 is arranged along the direction of maximal deformation (antinodal direction) of resonator 12 along mode 1 to have the maximum possible efficiency to drive the oscillation of resonator 12 along mode 1. Sense electrode 16 is also arranged along the direction of maximal deformation of resonator 12 to have the maximum possible sensitivity to the oscillation of resonator 12 along mode 1. Consistently, oscillation of resonator 12 along the mode 2 can be driven using a second drive electrode 18 arranged along the antinodal direction of mode 2 and the motion of resonator 12 along the mode 2 can be sensed using a second sense electrode 20 arranged symmetrically to sense electrode 18 with respect to the center 15 of the resonator. Drive electrode 18 is arranged along the direction of maximal deformation of resonator 12 along mode 2 to have the maximum possible efficiency to drive the oscillation of resonator 12 along mode 2. Sense electrode 20 is arranged along the direction of maximal deformation of resonator 12 to have the maximum possible sensitivity to the oscillation of resonator 12 along mode 2.

It is known to replace each sense and drive electrode by pairs of differential electrodes, straddling the antinodal directions, that are out of phase by 180 degrees to reduce parasitic feedthrough capacitance noise. Differential electrodes are for example taught in U.S. Pat. No. 10,236,858, which is hereby incorporated by reference in its entirety. Prior art that outlines transduction architectures for gyroscopes comprises U.S. Pat. No. 7,040,163B2, which discloses isolated planar gyroscope with internal radial sensing and actuation; U.S. Pat. No. 6,343,509B1, which discloses a gyroscope for sensing rate on at least two axes; and U.S. Pat. No. 6,823,734B1, which discloses electrostatic spring softening in resonators having redundant degree of freedom. These patents, which are hereby incorporated by reference in their entirety, use single-ended or differential electrodes. The U.S. Pat. No. 7,040,163B2 patent also requires electrodes internal to the resonator structure which is not required in the present disclosure.

The inventors have noted that the existing transduction architecture designs, such as those cited above, are optimized assuming a perfect symmetry of the resonator. However, such assumption is always met only in sensors including a resonator gyroscope that is mechanically trimmed and polished to obtain symmetry. Such resonators are expensive and ill-suited for cheap mass production, and the known CVGs end up with having a poor sensitivity if they use resonators that have poor symmetry.

There remains a need for a CVG having a satisfactory sensitivity even if the resonator has an impaired symmetry.

Embodiments of the present disclosure answer at least such a need.

SUMMARY

Embodiments of this presentation provide for driving the resonator of a CVG with drive electrodes almost aligned with a nodal direction of the resonator; i.e. a line along which no point of the resonator moves when the resonator resonates. The Inventors have noted that even though there exist a prejudice that arranging the drive electrodes almost aligned with a nodal direction of the resonator will make the resonator harder to drive, by reducing the transduction strength of the drive electrodes, in practice the drive forces developed by such drive electrodes are sufficient to drive the resonator satisfactorily. A technical effect of arranging the drive electrodes almost aligned with a nodal direction is that sense electrodes can now be arranged on both sides of the resonator along the related antinodal direction of the resonator to measure any energy passing from the driven mode into the sensed mode. This allows having at least two times more sensing electrodes than in a CVG as schematized in FIG. 1, thus allowing to increase the sensitivity of the CVG.

Preferably, the resonator is axisymmetric. According to embodiments of this presentation and to ease driving the resonator with such drive electrodes almost aligned with a nodal direction of the resonator, the drive electrodes are aligned along a diameter of the resonator, whereby the force exerted by a first drive electrode is exerted on one side of the nodal direction of the resonator, and the force exerted by the second drive electrode is exerted on a diametrically opposed point of the resonator, on the other side of the nodal direction of the resonator. A technical effect of applying drive forces simultaneously on diametrically opposed sides of the nodal direction is to increase the effect of the drive forces on driving the resonator by simultaneously applying a see-saw/push/pull like force on diametrically opposed sides of the resonator, where on one side of the node, the resonator is pushed on and the other side of the node the resonator is pulled on.

According to embodiments of this presentation, complementary drive electrodes are arranged symmetrically with respect to the nodal direction and driven in opposition of phase relative to the drive electrode. A technical effect of the combination of the drive electrodes and the complementary drive electrodes is to form differential drive electrodes which have an increased drive force on the resonator.

Embodiments of this presentation comprise a Coriolis vibratory gyroscope having an axisymmetric resonator with at least a first and a second n=2 degenerate vibratory modes, the first and second modes having each at least two nodes and two antinodes aligned, symmetrically with respect to a center of the resonator, respectively along first and second nodal directions and first and second antinodal directions; a plurality of electrodes arranged at a distance around a periphery of the resonator; wherein said plurality of electrodes comprise: a first pair of drive electrodes arranged symmetrically with respect to the center of the resonator along a direction that is closer to the first nodal direction than to the first or second antinodal directions or the second nodal direction; and at least one first pair of sense electrodes arranged symmetrically with respect to the center of the resonator along a direction that is closer to the second antinodal direction than to the first or second nodal direction or the first antinodal direction.

According to embodiments of this presentation, the Coriolis vibratory gyroscope further comprises a second pair of drive electrodes arranged symmetrically to the first pair of drive electrodes with respect to the first nodal direction; wherein the first and second pairs of drive electrodes form a first pair of differential drive electrodes.

According to embodiments of this presentation, the at least one first pair of sense electrodes comprise a plurality of first pairs of sense electrodes arranged each symmetrically with respect to the center of the resonator along a plurality of directions that are each closer to the second antinodal direction than to the first or second nodal direction or the first antinodal direction.

According to embodiments of this presentation, all of the sense electrodes of the plurality of first pairs of sense electrodes are connected together.

According to embodiments of this presentation, the plurality of electrodes further comprises: a third pair of drive electrodes arranged symmetrically with respect to the center of the resonator along a direction that is closer to the second nodal direction than to the first or second antinodal directions or the first nodal direction; and at least one second pair of sense electrodes arranged symmetrically with respect to the center of the resonator along a direction that is closer to the first antinodal direction than to the first or second nodal direction or the second antinodal direction.

According to embodiments of this presentation, the Coriolis vibratory gyroscope further comprises a fourth pair of drive electrodes arranged symmetrically to the third pair of drive electrodes with respect to the second nodal direction; wherein the third and fourth pairs of drive electrodes form a second pair of differential drive electrodes.

According to embodiments of this presentation, the at least one second pair of sense electrodes comprise a plurality of second pairs of sense electrodes arranged each symmetrically with respect to the center of the resonator along a plurality of directions that are each closer to the first antinodal direction than to the first or second nodal direction or the second antinodal direction.

According to embodiments of this presentation, all of the sense electrodes of the plurality of second pairs of sense electrodes are connected together.

These and other features and advantages will become further apparent from the detailed description and accompanying figures that follow. In the figures and description, numerals indicate the various features, like numerals referring to like features throughout both the drawings and the description.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

As outlined previously, known conventional Coriolis vibratory gyroscopes (CVG) rely on a symmetry of its mechanical resonator to sense an input rotation rate. Motion in the resonator is transduced (usually via capacitive, inductive or optical means) and controlled by the gyroscope sensor electronics to maintain sensitivity and noise performance of the sensor. In particular, the choice of the transduction architecture can have a significant effect on the sensor performance, as the device needs to simultaneously be driven by an AC drive force, tuned by DC forces to maintain mode match, and sensed in the optimal manner to realize high performance.

Figure 1:
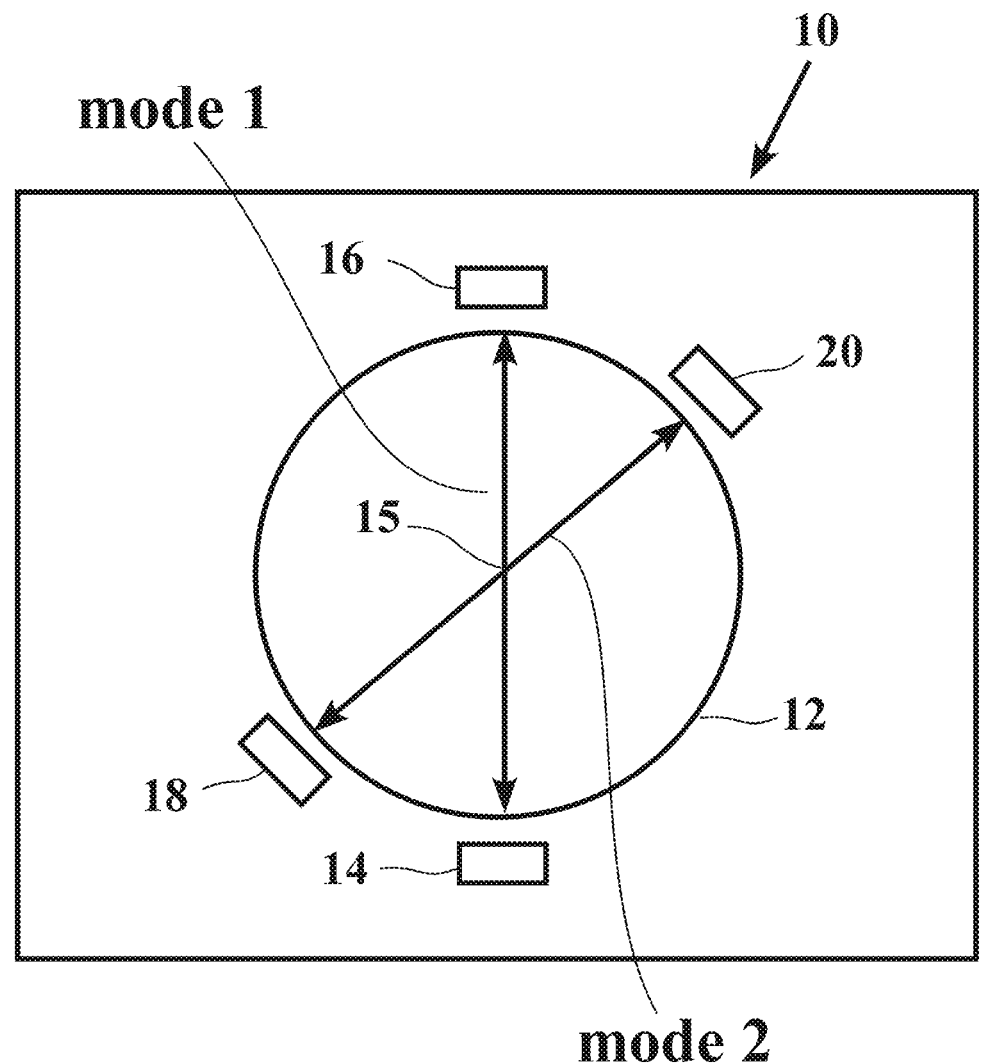
FIG. 1 illustrates a known CVG.
Figure 2:
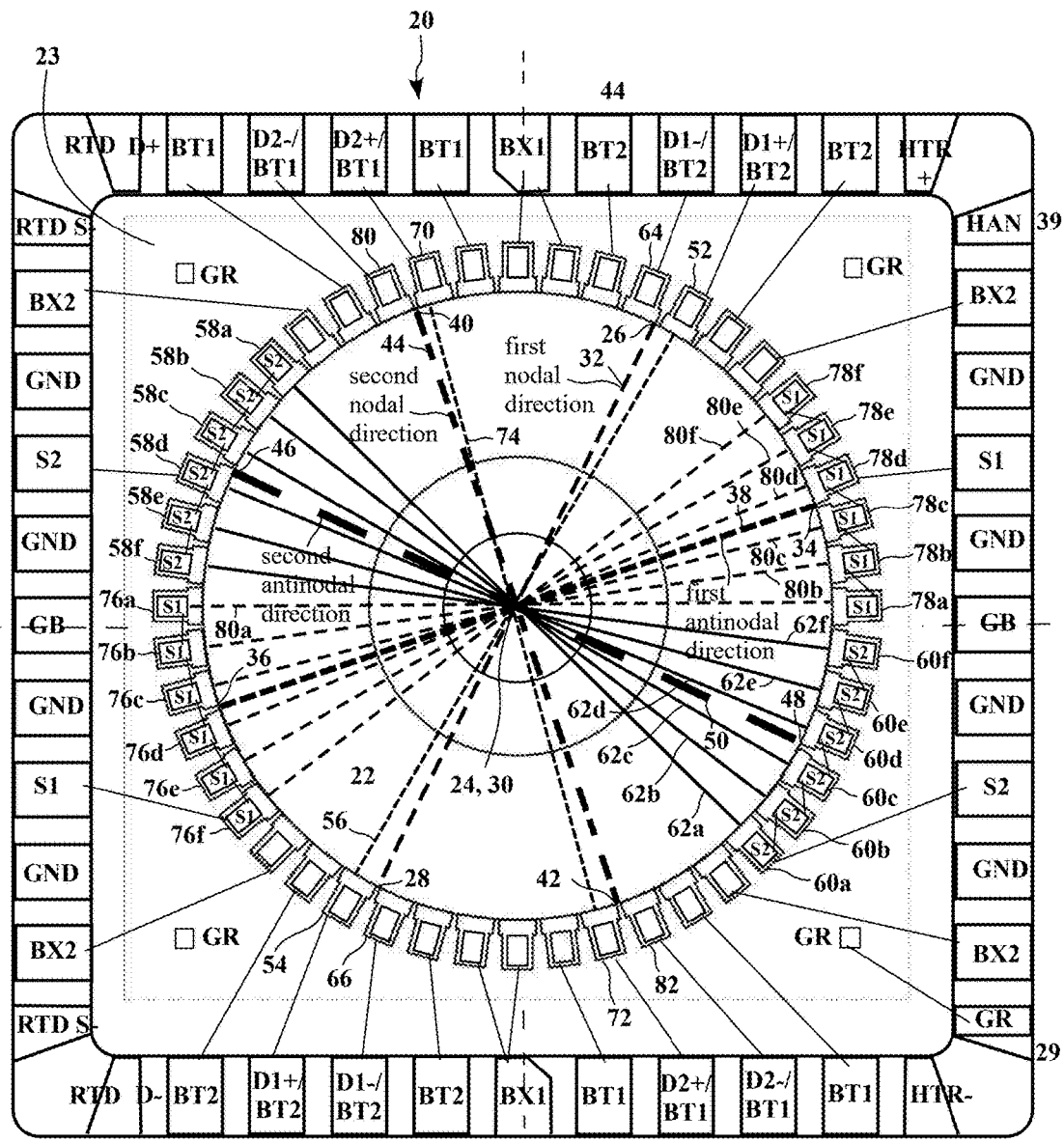
FIG. 2 illustrates a CVG according to embodiments of this presentation.

FIG. 2 illustrates schematically a Coriolis vibratory gyroscope (CVG) 20 according to embodiments of this presentation. CVG 20 comprises an axisymmetric resonant structure (resonator) 22 with an axis 24, the resonator exhibiting a degeneracy in its modal structure and comprising at least two modes (mode 1 and mode 2) at the same energy, and is arranged such that the Coriolis force couples energy from one of the modes to the other mode when a rotation rate around axis 24 is applied to resonator 22. A circular resonator 22 is illustrated but other axisymmetric shapes can be used, such as an octagonal shape such as described in U.S. Pat. No. 9,810,535B2, which is hereby incorporated by reference in its entirety. Resonator 22 can for example be mounted on a substrate 23 using a pillar (not shown) concentric with axis 24. According to embodiments of this presentation, CVG 20 comprises a first mode having at least two nodes 26, 28 aligned with a center 30 along a first nodal direction 32, and at least two antinodes 34, 36 aligned with center 30 along a first antinodal direction 38. First nodal direction 32 is shown as making an angle of 45 degrees with respect to first antinodal direction 38. Similarly, CVG 20 comprises a second mode having at least two nodes 40, 42 aligned with center 30 along a second nodal direction 44, and at least two antinodes 46, 48 aligned with center 30 along a second antinodal direction 50.

According to embodiments of this presentation, CVG 20 comprises a plurality of electrodes arranged on substrate 23 at a distance around a periphery of resonator 22 such that a capacitor of predetermined value is formed between the periphery of resonator 22 and each electrode, said predetermined value varying in a known manner when the distance between the resonator and the electrode changes, for example due to a vibration of the resonator. The resonator 22 can be mounted in a recess of substrate 23, such that the electrodes are arranged substantially flush with the periphery of resonator 22. According to embodiments of this presentation, said plurality of electrodes comprise at least a first pair of drive electrodes, 52 and 54, arranged symmetrically with respect to center 30 along a direction 56 that is closer to the first nodal direction 32 than to the first antinodal direction 38 or second antinodal direction 50 or the second nodal direction 44. According to embodiments of this presentation, the plurality of electrodes further comprise at least one first pair of sense electrodes 58a, 60a arranged symmetrically with respect to center 30 along a direction 62a that is closer to the second antinodal direction 50 than to the first nodal direction 32 or the second nodal direction 44 or the first antinodal direction 38.

According to embodiments of this presentation, the plurality of electrodes further comprises a second pair of drive electrodes 64, 66 arranged symmetrically to the first pair of drive electrodes 52, 54 with respect to the first nodal direction 32; wherein the first (52, 54) and second (64, 66) pairs of drive electrodes form a first pair of differential drive electrodes (52, 64 form a first differential electrode of the first pair and 54, 66 form a second differential electrode of the first pair). According to embodiments of this presentation, CVG 20 comprise drive electronics arranged to send a drive (AC) signal to electrodes 52 and 54 and the same drive signal, with a phase difference of 180 degrees, to the electrodes 64 and 66. The drive electronics can also be provided to bias the drive electrodes 52, 54, 64 and 66 with first DC signal and to bias the resonator with a second DC signal such that a total DC potential difference between the electrodes 52, 54, 64, and 66 and the resonator is the sum of the first and second DC voltages. A technical effect of driving electrodes 52, 54 and 64, 66 with AC signals that are 180 degrees out of phase is that the feedthrough currents generated by the parasitic feedthrough capacitances between the drive electrodes and the sense electrodes 58a, 60a, are out of phase and cancel each other out at the sense electrodes, thus resulting in an improved sensitivity of the CVG. It is to be noted that the drive pin locations help define the location in the structure where the mode will resonate, which simplifies the tuning of the devices and allows for more devices to be tuned to increase yield. Effectively, the drive pin locations pin the mode shape so that the node of the mode is located between the positive and negative AC drive pins. This aligns the antinodes of the mode with the BT electrodes and the nodes with the BX electrodes, which maximize the effect of the tuning forces and avoids mixing the effects of the tuning electrodes.

According to embodiments of this presentation (not illustrated), the at least one first pair of sense electrodes 58a, 60a can comprise a single pair of sense electrodes that are aligned with the second antinodal direction. According to embodiments of this presentation, and as illustrated in FIG. 2, the at least one first pair of sense electrodes 58a, 60a can comprise a plurality of first pairs of sense electrodes (six pairs are illustrated in FIG. 2: 58a, 60a; 58b, 60b; 58c, 60c; 58d, 60d; 58e, 60e; 58f, 60f) arranged each symmetrically with respect to the center 30 of the resonator 22 along a plurality of directions (62a; 62b; 62c; 62d; 62e; 62f) that are each closer to the second antinodal direction (50) than to the first (32) or second (44) nodal direction or the first antinodal direction (38). Effectively, the plurality of first pairs of sense electrodes form two series of sense electrodes (58a to 58f and 60a to 60f) arranged each symmetrically with respect to the second antinodal direction 50.

According to embodiments of this presentation, all of the sense electrodes (58a to 58f and 60a to 60f) of the plurality of first pairs of sense electrodes are connected together, thus forming a single large/wide radial angle capacitive sense electrode connected to a single transimpedance amplifier associated to sensing the second mode. This allows for a simpler amplifier structure on the sense transduction pins than for example previous designs using differential sense electrodes. Using a reduced number of amplifiers reduces the Johnson noise from the amplifiers and improves the gyro performance noise floor (e.g. gyroscope noise performance factors including angle random walk and angle white noise). Advantageously, having a wide radial angle sense capacitor allows to accurately measure the energy transferred from the first mode to the second mode even when the resonator lacks a high degree of internal symmetry.

CVG 20 can be operated in an "open loop" or a "closed loop" configuration. In open loop configuration, it suffices that the first mode be driven and the energy transferred from the first mode to the second mode be sensed. In a closed loop configuration, however, the second mode is actively driven to null the energy transferred from the first mode to the second mode. Closed loop configuration thus requires drive electrodes for driving the second mode. Sense electrodes are also required for sensing motions along the first mode.

According to embodiments of this presentation, the plurality of electrodes further comprises a third pair of drive electrodes 70, 72 arranged symmetrically with respect to the center 30 of resonator 22 along a direction 74 that is closer to the second nodal direction 44 than to the first 38 or second 50 antinodal directions or the first nodal direction 32; and at least one second pair of sense electrodes 76a, 78a arranged symmetrically with respect to the center 30 along a direction 80a that is closer to the first antinodal direction 38 than to the first 32 or second 44 nodal direction or the second antinodal direction 50.

According to embodiments of this presentation, the plurality of electrodes further comprises a fourth pair of drive electrodes 80, 82 arranged symmetrically to the third pair of drive electrodes 70, 72 with respect to the second nodal direction 44, wherein the third (70, 72) and fourth (80, 82) pairs of drive electrodes form a second pair of differential drive electrodes (70, 80 and 72, 82).

The at least one second pair of sense electrodes are arranged substantially the same way as the at least one first pair of sensing electrodes, but with respect to the first antinodal direction instead of the second antinodal direction. In detail, according to embodiments of this presentation the at least one second pair of sense electrodes (76a, 78a) comprise a plurality (six illustrated) of second pairs of sense electrodes (76a, 78a; 76b, 78b; 76c, 78c; 76d, 78d; 76e, 78e; 76f, 78f) arranged each symmetrically with respect to the center 30 of the resonator 22 along a plurality (six illustrated) of directions (80a, 80b, 80c, 80d, 80e, 80f) that are each closer to the first antinodal direction 38 than to the first (32) or second (44) nodal direction or to the second antinodal direction 50. According to embodiments of this presentation, the plurality of second pairs of sense electrodes form two series of sense electrodes (76a to 76f and 78a to 78f) arranged each symmetrically with respect to the first antinodal direction 36. Also, all of the sense electrodes of the plurality of second pairs of sense electrodes (76a to 76f and 78a to 78f) can be connected together to a single sense amplifier associated to the sensing of the first mode.

According to embodiments of this presentation, the substrate 23 can be mounted in a package having connection pads electrically connected to the electrodes of CVG 20. According to embodiments of this presentation, CVG can comprise in addition to the electrodes previously described, a number of additional electrodes such as DC tuning electrodes BT1, BT2 respectively arranged symmetrically with respect to the second and first nodal modes as well as bias quadrature electrodes BX1, BX2 arranged symmetrically with respect to the first and second nodal direction.

Embodiments of this presentations overall comprise a gyroscope transduction architecture that relies on exciting the mechanical mode close to a node of the motion with adjacent drive actuators; where optionally but advantageously sense transduction pins are combined together to reduce the amplifier noise.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ".

What is claimed is:

1. A Coriolis vibratory gyroscope having:
    an axisymmetric resonator with at least a first and a second n=2 degenerate vibratory modes, the first and second modes having each at least two nodes and two antinodes aligned, symmetrically with respect to a center of the resonator, respectively along first and second nodal directions and first and second antinodal directions;
    a plurality of electrodes arranged at a distance around a periphery of the resonator; wherein said plurality of electrodes comprise:
    a first pair of drive electrodes arranged symmetrically with respect to the center of the resonator along a direction that is closer to the first nodal direction than to the first or second antinodal directions or the second nodal direction; and
    at least one first pair of sense electrodes arranged symmetrically with respect to the center of the resonator along a direction that is closer to the second antinodal direction than to the first or second nodal direction or the first antinodal direction.

2. The Coriolis vibratory gyroscope of claim 1, further comprising a second pair of drive electrodes arranged symmetrically to the first pair of drive electrodes with respect to the first nodal direction; wherein the first and second pairs of drive electrodes form a first pair of differential drive electrodes.

3. The Coriolis vibratory gyroscope of claim 1, wherein the at least one first pair of sense electrodes comprise a plurality of first pairs of sense electrodes arranged each symmetrically with respect to the center of the resonator along a plurality of directions that are each closer to the second antinodal direction than to the first or second nodal direction or the first antinodal direction.

4. The Coriolis vibratory gyroscope of claim 3, wherein all of the sense electrodes of the plurality of first pairs of sense electrodes are connected together.

5. The Coriolis vibratory gyroscope of claim 1, wherein the plurality of electrodes further comprises:
    a third pair of drive electrodes arranged symmetrically with respect to the center of the resonator along a direction that is closer to the second nodal direction than to the first or second antinodal directions or the first nodal direction; and
    at least one second pair of sense electrodes arranged symmetrically with respect to the center of the resonator along a direction that is closer to the first antinodal direction than to the first or second nodal direction or the second antinodal direction.

6. The Coriolis vibratory gyroscope of claim 5, further comprising a fourth pair of drive electrodes arranged symmetrically to the third pair of drive electrodes with respect to the second nodal direction; wherein the third and fourth pairs of drive electrodes form a second pair of differential drive electrodes.

7. The Coriolis vibratory gyroscope of claim 5, wherein the at least one second pair of sense electrodes comprise a plurality of second pairs of sense electrodes arranged each symmetrically with respect to the center of the resonator along a plurality of directions that are each closer to the first antinodal direction than to the first or second nodal direction or the second antinodal direction.

8. The Coriolis vibratory gyroscope of claim 7, wherein all of the sense electrodes of the plurality of second pairs of sense electrodes are connected together.

* * * * *